June 19, 1962  D. H. HATHORN ET AL  3,039,535
MULTIPLE COMPLETION SAND SCREEN
Filed April 20, 1961  2 Sheets-Sheet 1
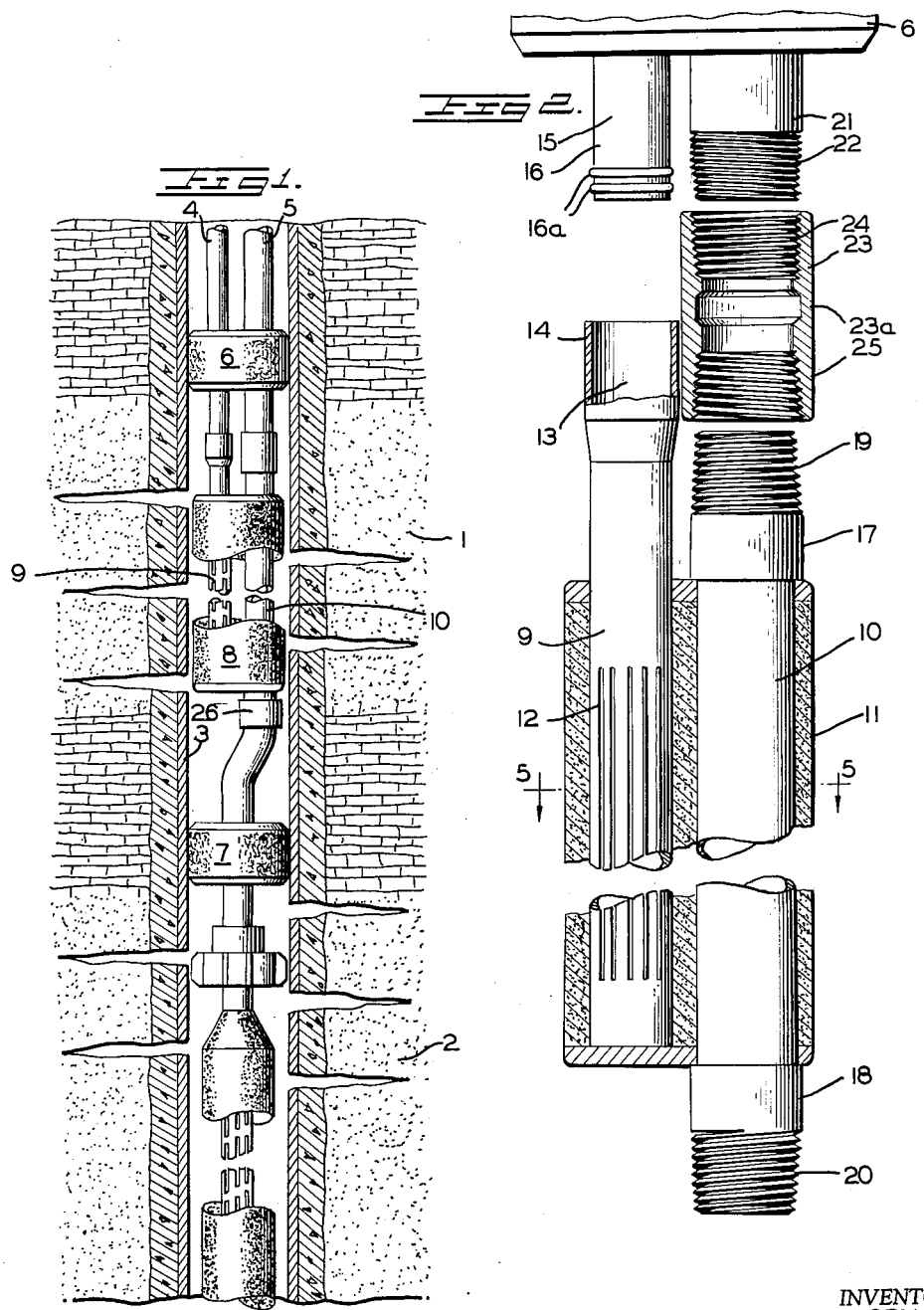
INVENTORS
DON H. HATHORN
THOMAS L. BROWN
By Burns, Doane, Benedict, Swecker & Mathis
ATTORNEYS

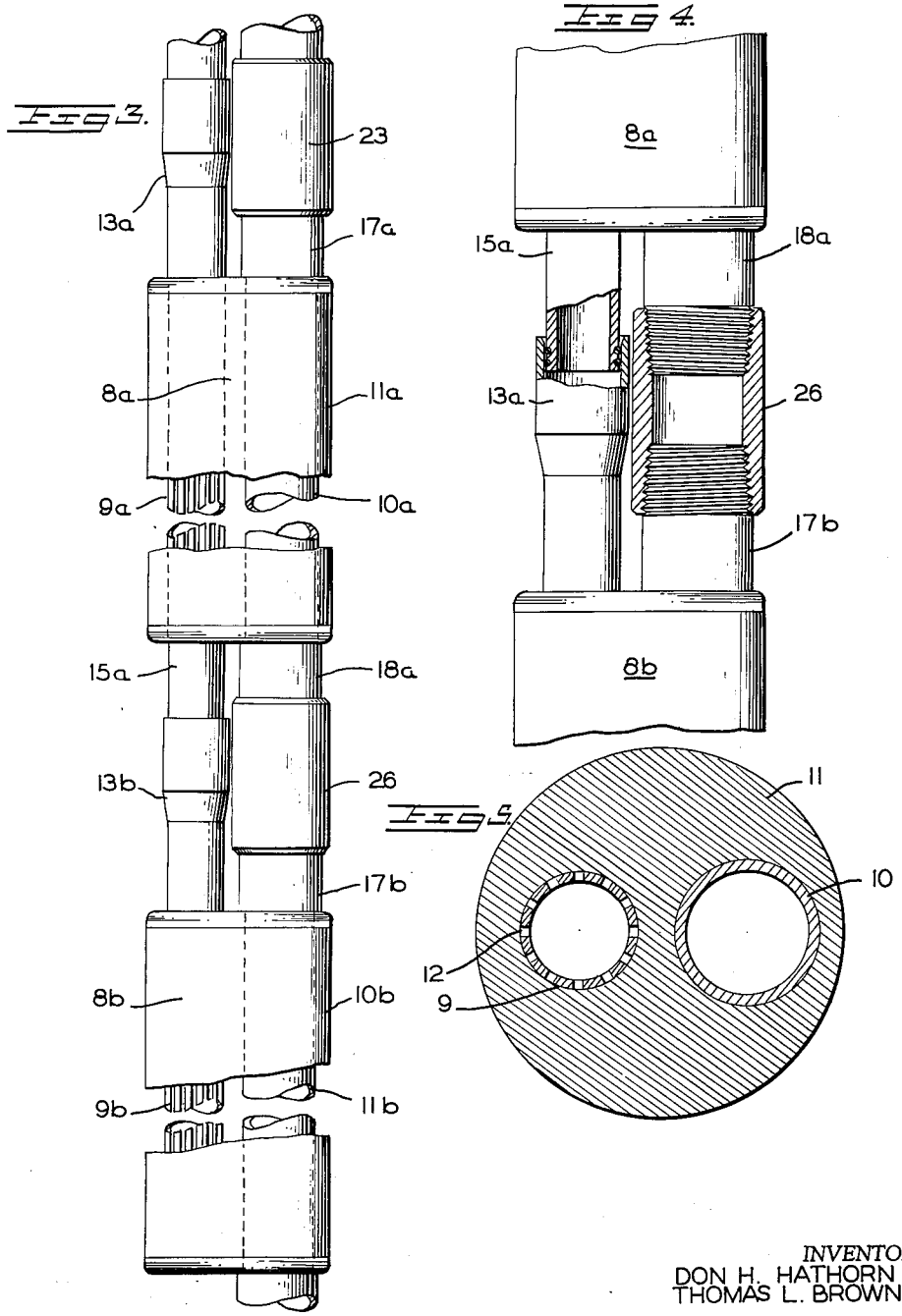

United States Patent Office 3,039,535
Patented June 19, 1962

3,039,535
MULTIPLE COMPLETION SAND SCREEN
Don H. Hathorn and Thomas L. Brown, Duncan, Okla., assignors to Halliburton Company, Duncan, Okla., a corporation of Delaware
Filed Apr. 20, 1961, Ser. No. 104,417
7 Claims. (Cl. 166—228)

This invention relates to a screen apparatus for use in well bores having multiple production zones.

Fluid bearing earth formations frequently are composed of poorly consolidated granular material. When a well bore is driven into such formations to produce fluids, there is a natural tendency for the material to move with formation fluid into the well bore. When in the well bore, the granular material compacts around the fluid receiving end of the production string of tubing so as to effectively reduce the radius of the well bore and thus decrease well productivity.

To prevent the accumulation of granular material in a well bore around the fluid receiving end of a production spring, a screen device may be mounted on the end of the string. Such a screen has a radius substantially larger than the end of the string and functions as a filter to permit the inflow of fluid into the string while preventing an accumulation of granular material around the string. In this manner there is preserved a predetermined radius of constant permeability in the production zone of a well bore.

In well bores in which there are a number of separate production zones, substantial problems are encountered in utilizing screens in the uppermost production zones. In such zones, one production string terminates in the zone and at least one additional string extends through the zone to lower producing formations. The presence of several strings in and of itself makes it difficult to provide a screen having an effective radius and creates stress conditions resulting from relative movement between strings. Additional problems are presented in fabricating a durable screen for use in such an environment and in providing conveniently manipulatable connections for installing the screen.

In this invention there is contemplated a multiple completion well screen apparatus which provides maximum screening effect, which is characterized by ease of fabrication and assembly, and which possesses high structural strength.

Specifically, it is an object of this invention to provide a multiple completion screen of maximum diameter which may be conveniently fabricated by molding techniques.

It is a further object of the invention to provide a molded screen having axially extending reinforcement.

It is an additional object of the invention to provide a screen apparatus which may be conveniently installed in multiple production strings in such a manner as to alleviate the imposition of shear stress on the screen resulting from differential production string movement.

A still further object of the invention is to present a multiple completion screen apparatus which is sectional in character to permit of ease of handling and allow limited axial flexing.

To accomplish the foregoing objectives, a multiple completion well screen apparatus is envisaged which includes an elongate fluid permeable body of coherent granular material, which body is composed of relatively fine granules such as sand bonded by a thermo-setting resin. A first conduit means extends longitudinally in this body, is resin bonded to the body, and has radially extending openings providing fluid communication between the permeable body and the conduit interior. A second conduit means extends longitudinally through the body and is resin bonded to the body to provide body reinforcement. This second conduit means is imperforate so as to prevent fluid flow from the body into its interior. A first tubular coupling portion is included on the first conduit means at one end of the body and has a generally smooth, cylindrically configured coupling surface extending axially of this conduit means. A second tubular coupling portion is provided on the second conduit means on the one end of the body and has a threaded terminus. There is also included a third tubular coupling portion on the second conduit means on the other end of the body which also has a threaded terminus.

The detailed characteristics of the well screen of this invention will be set forth in the context of a preferred embodiment illustrated in the accompanying drawings in which:

FIGURE 1 is a longitudinal sectional view of a well bore showing an installed multiple completion screen apparatus, FIGURE 2 is an enlarged sectional view of a well screen apparatus shown installed in FIGURE 1, FIGURE 3 is an elevational view of a sectional multiple completion screen apparatus, FIGURE 4 is a partially sectioned elevational view of the connection between adjacent screen devices of the FIGURE 3 apparatus, and FIGURE 5 is a sectional view along the line 5—5 of FIGURE 2.

In FIGURE 1 there is shown a multiple completion well bore including an upper producing zone 1 and a lower producing zone 2. The well bore is shown as being lined with a casing 3 which is perforated in both production zones. Within the casing there is positioned a multiple completion production string including a tubing string 4 terminating in upper production zone 1 and a tubing string 5 terminating in lower production zone 2. Conventional production packers 6 and 7 are mounted on the composite production string to segregate the producing zones.

In the upper production zone 1, a dual completion well screen 8 is mounted on tubing strings 4 and 5. Screen 8 as illustrated, is an elongate body of circular cross section extending axially of and embracing the perforate lower section 9 of production string 4 and the laterally adjacent section 10 of production string 5.

The body of the screen 8 is composed of a coherent mass of granular material, such as sand, bonded by a resin. A highly satisfactory material for the screen is round Ottawa sand ranging in size between 20 and 40 mesh. This sand, when consolidated and bonded with a thermosetting resin, such as an epoxy resin, has been found to have a permeability of approximately 50 darcys. There is thus provided high screening effectiveness and optimum permeability.

In fabricating the screen, a mold is employed in which the conduit sections 9 and 10 are supported within a shaped mass of resin and granular material for heat curing of the resin. During the setting operation, there is effected a bond between the resin body and the outer surfaces of the conduits 9 and 10. Augmenting this bond is the consolidation of the sand mass in circumscribing engagement with the pipe exterior.

A completed sand screen device, as illustrated in FIGURE 2, includes elongate fluid permeable body 11 of coherent granular material, radially perforated conduit section 9 and imperforate conduit section 10. As shown in FIGURE 5 radial openings 12 in conduit section 9 provide fluid passages communicating the permeable body with the interior of the pipe section 9. Conduit section 10, being imperforate, effectively seals the body 11 from its interior. Fluid flowing into the well bore from upper production zone 1 passes through the body 11 of granular material and the radial openings 12 into the interior of conduit section 9. Imperforate conduit section 10, extending as shown in FIGURE 1 to the lower production zone 2, provides a sealed flow path for fluid passing from the lower production zone through the upper zone.

The upper end of conduit section 9 is provided with a tubular coupling portion 13. This coupling portion has a smooth, cylindrically configured internal surface 14 extending axially of conduit section 9 for telescoping engagement with a coupling portion 15 on production string 4. Coupling portion 15 has a cylindrically configured, external surface 16 of generally smooth configuration and includes sealing rings 16a.

Conduit section 10 includes tubular portions 17 and 18 extending from the upper and lower ends of the body 11, respectively. The terminus 19 of coupling portion 17 is externally threaded as is the terminus 20 of coupling portion 18.

As shown in FIGURE 2, in production string 5 there is included a coupling portion 21 having a lower, externally threaded terminus 22. Threaded terminus 19 and threaded terminus 22 are oppositely threaded. In the illustrated configuration, terminus 19 is provided with right handed threads while terminus 22 is provided with left handed threads. To couple terminus portions 19 and 22, a coupling collar 23 is employed. Collar 23 has at its upper end an internal, left hand threaded portion 24 for mating engagement with terminus 22 and at its lower end an internal, right hand threaded portion 25 for engagement with terminus 19.

Through the coupling structures described, including the telescoping connection in production string 4 and the unique threaded connection in coupling string 5, the multiple completion sand screen 8 may be readily assembled in the composite production string. By engaging coupling collar 23 with termini 19 and 22 and imparting right hand rotation to this collar, both terminus 19 and terminus 22 will be threadably advanced into the collar to provide a sealing connection between coupling portions 17 and 21. During the axially converging movement of terminal portions 19 and 22, coupling portions 13 and 15 in string 4 will axially converge so as to effect telescoping engagement of cylindrical coupling surface 16 including seal rings 16a, with cylindrical coupling surface 14. The lower terminus 20 of conduit section 10 is coupled with the portion of production string 5 extending to the lower production zone by a conventional threaded joint 26.

In lieu of the threaded coupling sleeve 23, there may be employed a conventional tension separable coupling. Such a coupling includes sections which are separable in response to a tensionally exerted force of predetermined magnitude. Usually the sections are joined by a frangible web, equivalent to an intermediate wall portion 23a of reduced thickness in sleeve 23, which will rupture at the desired load to permit of axial separation of the coupling sections. With such a tension sleeve employed, the production string may be disconnected from the screen apparatus in response to an upward pull exerted on the string.

Where formation thicknesses of five feet or less are encountered, a unitary sand screen device has been found to be entirely satisfactory. In substantially thicker formations, however, it is desirable to sectionalize the sand screen to facilitate handling and installation. Such a sectionalized assembly is illustrated in FIGURE 3.

The composite sand screen assembly shown in FIGURE 3 includes an upper screen device 8a and a lower screen device 8b. The upper screen device 8a includes an elongate body of coherent granular material 11a in which are bonded axially extending, radially perforated conduit section 9a and imperforate conduit section 10a. The perforate section 9a extends entirely through the body 11a and is provided with an axially extending, smooth surfaced, female cylindrical coupling portion 13a above the device 8a and an axially extending, generally smooth surfaced, male cylindrical coupling portion 15a below this device. Conduit section 10a has an upper coupling portion 17a having an externally threaded terminus and a lower coupling portion 18a also having an externally threaded terminus.

The lowermost screen device 8b includes an elongate mass of coherent granular material 11b in which are embedded perforate conduit section 9b and imperforate conduit section 10b. The radially perforated section 9b terminates at the lower end of the body 11b in the manner shown in FIGURE 2 and carries at its upper end an axially extending, smooth surfaced, female cylindrical coupling portion 13b. Conduit section 10b carries an upper coupling portion 17b having an externally threaded terminus and passes through the body 11b for connection through suitable coupling means below the device to the remainder of the production string 5 extending to a lower production zone.

With the couplings carried on the adjacent ends of conduit sections extending from the devices 8a and 8b, as described, the devices 8a and 8b may be connected in the same manner in which the sand screen is integrated into the multiple conduit production string. The facing terminus portions of coupling portions 17b and 18a are threaded in opposite directions such that a coupling collar 26 having oppositely threaded internal end portions may be employed to draw the threaded termini into the coupling as shown in FIGURE 4 and effect simultaneous telescoping engagement of tubular coupling portions 13b and 15a.

The sectional character of the sand screen assembly illustrated in FIGURE 3 facilitates the fabrication of a screen of any desired length through the use of standard size screen units. It is merely necessary to assemble as many upper units 8a above a base unit 8b as may be necessary to achieve the desired sand screen length. The discrete spaced character of the coherent granular bodies included in the assembly, permits of limited axial flexing of the assembly without the fracturing of these units. Because of the unique coupling arrangement, the assembly of a composite unit may be expeditiously accomplished.

Through the use of telescoping couplings in one of the production strings, in lieu of a threaded coupling corresponding to that employed in the other string, there is avoided the necessity of tediously attempting to simultaneously threadably couple parallel conduits. The use of oppositely threaded terminal portions on facing conduit ends avoids the necessity of employing expensive and structurally more complicated couplings such as unions.

Several factors contribute to the remarkable structural strength of the screen. The imperforate conduit extending through the screen and bonded on its exterior surface to the surrounding granular body functions as a longitudinal reinforcing member. This conduit section, which is in the string extending to the lowermost formation, is provided with the threaded couplings such that the axial load of the string is carried principally on this section. The telescoping couplings in the other string enable limited differential movement between the strings without the imposition of shear stresses on the granular screen bodies of excessive magnitude. The discrete character of the screen devices in the composite or sectionalized assembly enables limited flexing of the assembly and avoids the fracturing of the granular bodies which would occur in a unitary body of great length.

In surrounding all the production strings extending through a production zone, the screen is of maximum diameter so as to provide maximum well bore drainage efficiency.

While the invention has been described with reference to a two-zone well completion and a two-unit composite screen assembly, it is readily apparent that it may be adapted to multiple completions employing in excess of two production strings and that composite screens of any desired number of sections may be fabricated. It is equally apparent that granular material other than the sand specified and resins other than the epoxy resins could be utilized. Other minor modifications will readily occur to those skilled in the art which are well within the scope of the invention as defined in the accompanying claims.

We claim:

1. A screen apparatus for use in well bores having multiple production zones, said apparatus comprising: an elongate, fluid permeable body of coherent granular material, said body comprising relatively fine granules bonded by a resin; first longitudinally extending conduit means in said body, said first conduit means being resin bonded to said body and having radially extending openings providing fluid communication between said permeable body and said first conduit means interior; second longitudinally extending conduit means passing through said body, said second conduit means being resin bonded to said body to provide reinforcement thereof and being imperforate to seal said body from said second conduit means interior; a first tubular coupling portion on said first conduit means at one end of said body, said first tubular coupling portion at its terminus having first coupling means adapted to make a telescopable axial connection; a second tubular coupling portion on said second conduit means at said one end of said body, said second tubular coupling portion having second coupling means for making a rigid axial connection; and a third tubular coupling portion on said second conduit means at the other end of said body, said third tubular coupling portion having third coupling means for making a rigid axial connection.

2. A screen apparatus for use in well bores having multiple production zones, said apparatus comprising: an elongate, fluid permeable body of coherent granular material, said body comprising relatively fine granules bonded by a thermo-setting resin; first longitudinally extending conduit means in said body, said first conduit means being resin bonded to said body and having radially extending openings providing fluid communication between said permeable body and said first conduit means interior; second longitudinally extending conduit means passing through said body, said second conduit means being resin bonded to said body to provide reinforcement thereof and being imperforate to seal said body from said second conduit means interior; a first tubular coupling portion on said first conduit means above said body, said first tubular coupling portion having a generally smooth, cylindrically configured, internal coupling surface extending axially of said first conduit means; a second tubular coupling portion on said second conduit means above said body, said second tubular coupling portion having an externally threaded terminus; and a third tubular coupling portion on said second conduit means below said body, said third tubular coupling portion having an externally threaded terminus.

3. An apparatus as defined in claim 2 wherein said first conduit means passes through said body, said apparatus including a fourth tubular coupling portion on said first conduit means below said body, said fourth coupling portion at its terminus having a generally smooth, cylindrically configured, external coupling surface extending axially of said first conduit means.

4. An apparatus as defined in claim 2 wherein said first conduit means terminates substantially at the lower end of said body.

5. A screen apparatus for use in well bores having multiple production zones, said apparatus comprising: at least two axially aligned and vertically spaced screen devices, each said device including a fluid permeable body of coherent granular material, said body comprising relatively fine granules bonded by a thermo-setting resin; first longitudinally extending conduit means in said body, said first conduit means being resin bonded to said body and having radially extending openings providing fluid communication between said permeable body and said first conduit means interior, second longitudinally extending conduit means passing through said body, said second conduit means being resin bonded to said body to provide reinforcement thereof and being imperforate to seal said body from said second conduit means interior, a first tubular coupling portion on said first conduit means above said body, said first tubular coupling portion at its terminus having a smooth, cylindrically configured internal coupling surface extending axially of said first conduit means; a second tubular coupling portion on said second conduit means above said body, said second tubular coupling portion having an externally threaded terminus; a third tubular coupling portion on said second conduit means below said body, said third tubular coupling portion having an externally threaded terminus; said lowermost screen device having said first conduit means sealed at the lower end of said body; said uppermost screen device having said first conduit means passing through said body and including a fourth tubular coupling portion on said first conduit means below said body, said fourth coupling portion at its terminus having a generally smooth, cylindrically configured, external coupling surface extending axially of said first conduit means; said first conduit means of adjacent screen devices being connected by axially telescoping engagement of a smooth surfaced, cylindrically configured internal coupling portion carried by the first conduit means of one of said adjacent devices with a generally smooth surfaced, cylindrically configured external coupling portion carried by the first conduit means of the other of said devices; said second conduit means of adjacent devices being connected by threaded coupling means including an externally and right hand threaded terminus on one end of the second conduit means of one of said adjacent devices, an externally and left hand threaded terminus on one end of the second conduit means of the other of said adjacent devices, and a coupling collar having one end internally and right hand threaded to engage the second conduit terminus of said one device and the other end internally and left hand threaded to engage the second conduit terminus of the other of said adjacent devices.

6. An apparatus as defined in claim 5 including a tension separable coupling carried by the upper terminus of the second conduit means of the uppermost screen device.

7. A screen apparatus as described in claim 1 wherein said first coupling means comprises a smooth, cylindrically configured coupling surface extending axially of said first conduit means; wherein said second coupling means comprises a threaded terminus; and wherein said third coupling means comprises a threaded terminus.

References Cited in the file of this patent

UNITED STATES PATENTS

| | | |
|---|---|---|
| 2,843,209 | Degen | July 15, 1958 |
| 2,925,097 | Duesterberg | Feb. 16, 1960 |
| 2,965,173 | Brown | Dec. 20, 1960 |